No. 634,722. Patented Oct. 10, 1899.
G. F. DILLON.
ACETYLENE GAS GENERATOR.
(Application filed Nov. 11, 1898.)
(No Model.) 2 Sheets—Sheet 1.
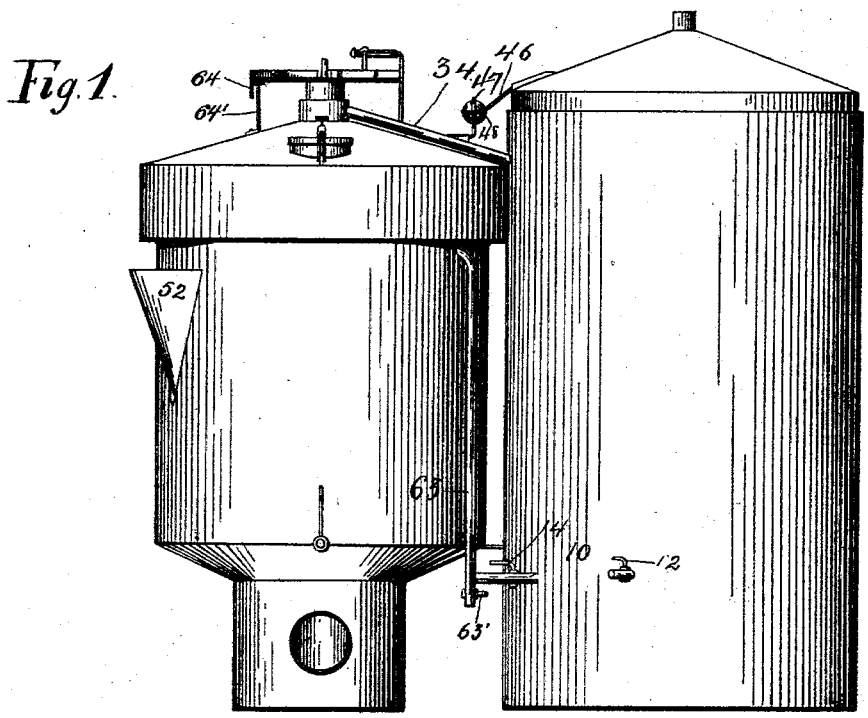
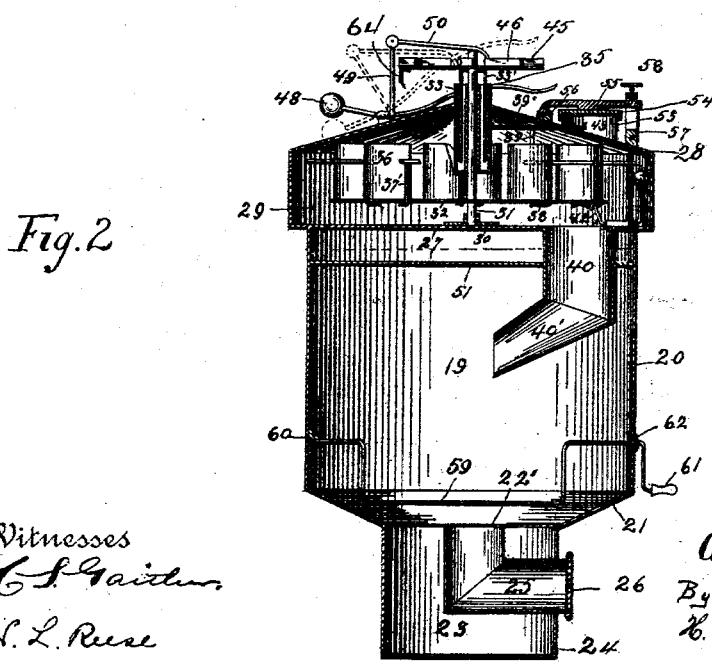
Witnesses
Inventor
George F. Dillon
By H. C. Evert & Co.
Attorneys No. 634,722. Patented Oct. 10, 1899.
G. F. DILLON.
ACETYLENE GAS GENERATOR.
(Application filed Nov. 11, 1898.)

(No Model.) 2 Sheets—Sheet 2.

Witnesses

Inventor
George F. Dillon

UNITED STATES PATENT OFFICE.

GEORGE F. DILLON, OF GRANVILLE, OHIO.

ACETYLENE-GAS GENERATOR.

SPECIFICATION forming part of Letters Patent No. 634,722, dated October 10, 1899.

Application filed November 11, 1898. Serial No. 696,125. (No model.)

*To all whom it may concern:*

Be it known that I, GEORGE F. DILLON, a citizen of the United States, residing at Granville, in the county of Licking and State of Ohio, have invented certain new and useful Improvements in Gas-Generators; and I do hereby declare the following to be a full, clear, and exact description of the invention, such as will enable others skilled in the art to which it appertains to make and use the same.

This invention relates to certain new and useful improvements in gas-generators.

The invention is designed primarily for the production of acetylene gas from calcium carbid by the application of water thereto; but it may also be advantageously employed for the production of gas that is formed by the union of other solids with a liquid.

The invention has for its object to provide a cheap, simple, and effective form of apparatus for generating gas and by means of which the quantity of gas generated will be automatically regulated to correspond with the amount of gas consumed.

A further object of my invention is to construct an apparatus for the purpose described in which the carbid will be supplied to the water in fixed quantities, and by plunging the fixed amount of the carbid into the water automatically the gas will be generated in a cool state, and as the gas is rising out of the water the latter serves as a wash to remove such impurities as ammonia, sulfureted and phosphureted hydrogen, nitrogen, and carbonic oxid, each of which is very objectionable and destructive to the illuminating properties of the acetylene.

I will now describe the apparatus by means of which I accomplish the above results and in such description will have reference to the accompanying drawings, wherein like numerals of reference will be used to designate like parts throughout the several views, in which—

Figure 3:
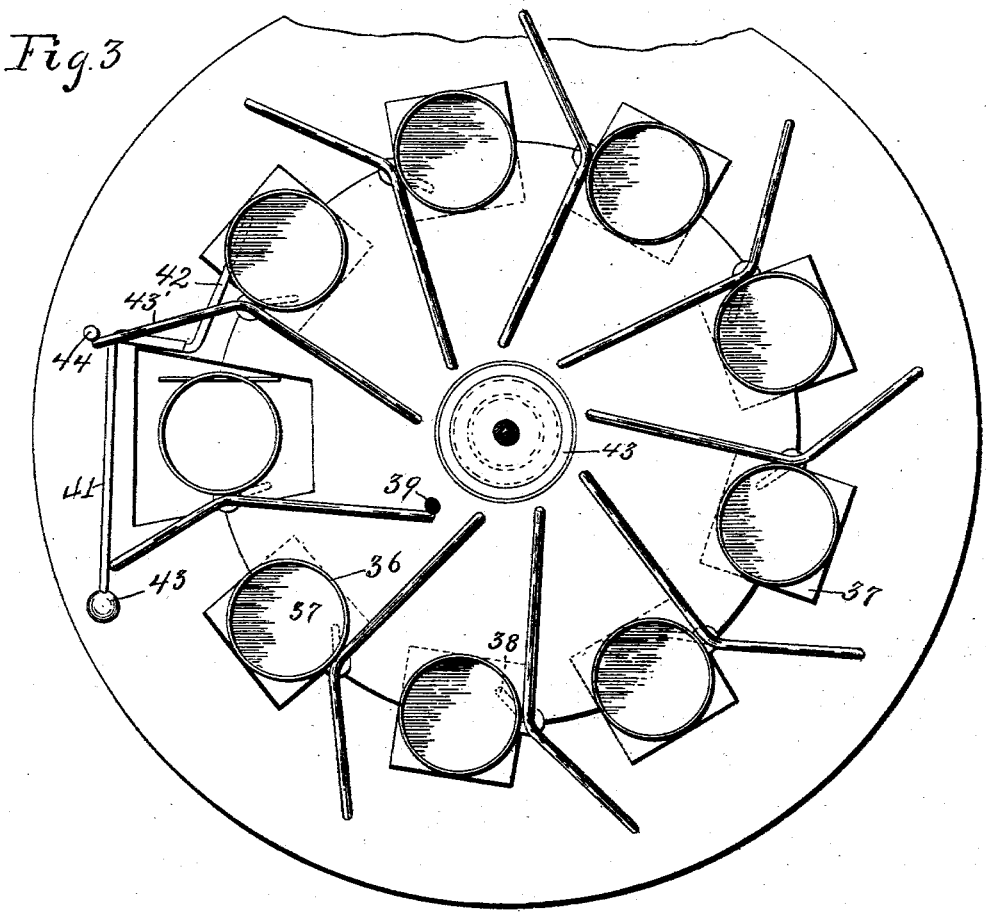
Figure 4:
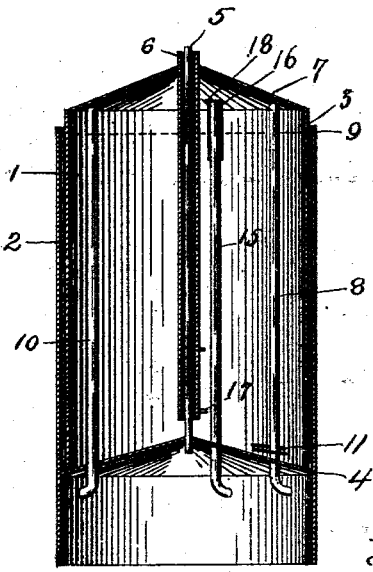

Figure 1 is a side elevation of my improved gas-generator. Fig. 2 is a vertical sectional view of the generator. Fig. 3 is a top plan view of the same with cover removed. Fig. 4 is a vertical sectional view of the gas-holder and regulating device.

Referring now to the drawings, the reference-numeral 1 indicates the gas-holder, which is of the gasometer type. This holder is formed of an outer casing 2 and an inverted casing or bell 3, which is inside of the casing 2 and within which it is adapted to operate, as will be hereinafter fully described. The outer casing 2 is provided near its lower end with a bottom 4, which is in the form of a frustum of a cone, and to the apex of which is secured a vertically-extending rod 5, which is incased by a pipe or sleeve 6, passing through the top or cover 7 of the inner casing or bell 3 and adapted to guide the said casing or bell in its vertical movement within the outer casing 2. A pipe 8, leading to the gas-main, passes through the outer casing 2 and upward through the bottom 4 to a point within the tank slightly above the water-line 9, and a like pipe 10 is arranged in a similar manner and connected with the generator or with a pipe leading therefrom. In order to prevent rotation of the inner casing or bell 3, the pipes 8 and 10, or either one thereof, may be secured to the walls thereof by suitable stays 11. The pipe 10, leading to the generator, is provided with a suitable stop-cock 14 to shut off the supply of gas from the generator to the gas holder or tank when it is desired to do so, and is principally employed for this purpose when there is gas in the holder or tank 1 and it is found necessary to charge the generator.

Extending vertically within the gas holder or tank 1 is an overflow-pipe 15, by which in event of accidental overflow of gas or overproduction of gas from any unknown cause the gas will be liberated and carried from the building by said pipe to the external air, thus preventing any danger from an accumulation of such overflow of gas in the building. Supported upon the upper end of this escape or overflow pipe 15 is an inverted cap 16, the opening of which is larger than the diameter of the pipe, so that the seal formed by the closed end of the cap resting on the pipe may be broken. The dissolution of this seal is accomplished by means of a pin 17, near the lower end of the pipe or sleeve 6, coming in contact with a lug 18, formed on the cap 16, as the tank 3 ascends, thus serving to raise the lower end of the cap 16 above the water-line and permit the gas to pass through between the inner walls of the same and the outer walls of the escape or overflow pipe 15 and into said pipe, where it is conducted to the open air.

The generator 19 is formed of a suitable casing 20, shown in the accompanying drawings as being cylindrical in form, with the sides contracted and sloping near the lower end, as at 21, and connected to the bottom 22, which has a central opening 22'. This contraction of the sides forms a chamber 23 of less diameter than the generator 19, and in the walls 24 thereof is mounted an elbow or other suitable shaped pipe 25, the upper end of which is connected to the bottom and surrounds the opening 22' and the other end of which may project slightly beyond the wall 24 and be provided on its end with a suitable cap 26. This pipe and cap must of necessity be of considerable capacity in order to carry off the residuum, which at the time of removal is in a state consistent to thick mud or the like. The walls 24, inclosing the chamber 23, serve to form a support for the pipe 25 and are provided merely for this purpose, the chamber 23 having no object or function.

This gas-generator is divided into two compartments separated by a horizontal wall 27, which also acts as a bottom for the dome 28, mounted on top of the casing 20 and inclosing the upper compartment 29. Arranged centrally upon the upper face of the bottom 27 is a bearing or socket 30, which receives the lower end of a vertical shaft or spindle 31, extending upwardly above the apex of the dome and upon which within said dome is mounted a plate 32. This plate revolves with the spindle, and in order to make the opening through the dome air-tight and a joint that will remain tight and at the same time permit the spindle 31 to turn freely with the least possible friction I provide a sleeve 33, having a concentrically-arranged tube which is secured to the spindle. I also secure to the spindle a short distance above the upper end of the sleeve 33 an auxiliary sleeve or tube 33', which projects downwardly into the annular passage between the sleeve 33 and its concentrically-arranged tube, the sleeve 33 being open at its top and closed at its bottom and the auxiliary sleeve 33' being open at its lower end and closed at its top. Connected to this sleeve 33 and to the tank 2 is a pipe 34, the connection of which with the tank 2 and with the sleeve 33 is below the water-line 9, (see Fig. 4,) thereby preventing any water from entering at the top or point 35 of the sleeve, which is higher than the tank or gasometer sides 2. This thus forms a gasometer-joint, and the water is supplied to this joint from the gas-holder or from any suitable tank, thus insuring a tight joint and with the friction reduced to a minimum. This reduction of the friction insures a steady pressure of the gas and a consequently steady light.

Upon the upper face of the plate 32, around the outer edge thereof, is mounted a series of buckets or holders 36 to receive the calcium carbid or other gaseous material, which have bottoms 37, hinged to their forward side, said forward side being of course determined by the direction of rotation of the buckets or holders. Pivotally secured to each of these buckets is a T-shaped catch 37', the lower end 38 of which is bent so as to engage the hinged bottom 37 and retain the same closed during its path of travel until the inner end of the T-shaped catch is engaged by the trip 39, which is arranged in a slide 39', supported from the dome. When this inner end of the catch is engaged by the trip, the end 38 of the catch is relieved from its engagement with the hinged bottom 37, thus allowing the same to swing open and precipitate the contents of the buckets or holders into the spout 40, that is connected to the bottom 27, from where it is precipitated into the tank 19. For the purpose of again closing the hinged bottom of each bucket or holder after the same has been emptied of its contents in the manner heretofore described I pivotally secure to the bottom 27 a lever 41, the one end of which is curved, as at 42, to engage the hinged bottoms and which end is held normally in the elevated position by means of a weight 43 on the opposite end. As the respective holders or buckets pass beyond the opening of the spout 40 they are engaged by the curved end 42 of the lever and forced upwardly against the bucket or holder, at which time the outer end of the T-shaped catch 37' comes into engagement with the vertical rod or bar 44 provided therefor in the dome, and the said T-shaped catch is turned so as to engage underneath the hinged bottom of the bucket or holder and retain the same closed and in condition for refilling until such time as they have completed another revolution and come into engagement with the trip 39, and the operation is repeated. This trip 39 projects through an opening $43^2$ in the dome and is made slidable, so that in recharging it may be forced inwardly out of engagement with the end of the T-shaped catch in order to allow the hinged bottom to remain closed during the revolution of the buckets at the time of recharging.

Mounted upon the shaft or spindle 31 above the dome is a circular plate 45, which is provided with a series of peripherally-arranged wings or flanges 46, of which there is a like number to that of the buckets or holders. This plate 45 is adapted to be operated by the gasometer through its connection therewith, and the consequent operation of the plate serves to operate the buckets or holders, so as to revolve the same and allow them to consecutively deposit their contents into the spout 40 and tank 19.

Rigidly secured to the dome of the gasometer and projecting beyond the rim thereof is a curved arm 46', which is engaged by the curved lever 47, pivotally mounted on top of the dome of the gas-generator. This curved lever 47 is provided on its one end with a weight 48, serving to hold said lever in engagement with the curved arm 46, and is also provided with an upwardly-extending arm 49, to the free end of which is pivotally secured the operating-lever 50, which engages the wings or flanges 46 to operate the plate 45, and thus rotates the plate 32, carrying the buckets or holders 36.

The spout 40 has its lower end 40' extending at oblique angles to the spout proper, thereby forming a guard to prevent the gas as it bubbles up through the water from entering the said spout. Arranged within the tank above this guard of the spout is a screen or perforated plate 51, which serves to disintegrate the larger bubbles into smaller ones, as were these large bubbles allowed to remain they would cause forcible ebullition, which would cause the light to flicker.

A spout 52 is provided at the side of the tank 19 for the introduction of water into the tank and to prevent the gas from escaping. The spout is provided with an extension or guard like the guard 40' of the spout 40. This spout 52 is also intended to be used as a hand-feed, through which the carbid may be supplied to the tank 19 should the carbid in the holders or buckets become exhausted, or in case of an emergency or accident to the holders or buckets, in which event the carbid is thrown into the spout which serves the same purpose as spout 40.

In order to give access to the buckets or holders, I provide the dome with the opening 43² and provide around this opening a wall 53, which is adapted to receive the cap 54 for closing the opening. This cap is firmly held in position by means of a lever 55, pivoted at its rear end to a lug 56 on the dome and provided on its underneath face, centrally thereof, with a bushing to engage the cap 54. At its forward end the lever is held by engaging the same in a clevis 57, which is also pivotally secured to the dome. For the purpose of retaining the clevis in engagement with the lever 55 a set-screw 58 is provided in the closed end of the clevis.

In the lower part of the generator 19 an agitator of suitable construction is arranged for thoroughly mixing and dissolving the carbid. That shown in the accompanying drawings is composed of a bell-shaped crank 59, the one end thereof being journaled in a bearing 60 provided therefor on the inner face of the generator-casing and the other end having a suitable handle 61. A suitable stuffing-box 62 is provided at the point where this crank passes through the casing.

The residuum may be drawn off from the generator in any suitable manner.

On the end of the pipe 63, which connects the pipe 10 from the tank with the generator, is a stop-cock 63' to draw off any condensation in the pipe and is also intended to remove the air from the generator.

Secured to the underneath face of the plate 45 is an indicator-hand 64, and secured to the top of the drum is a projection 64'. This hand 64 and projection 64' operate as an indicator by which the operator can tell how many holders or buckets contain carbid. By counting the wings 46 in the opposite direction in which the plate 45 is turning, from the hand 64 to the projection 64', the operator will know how many buckets have been emptied.

By such a construction of a generator it will be observed that as the quantity of gas in the tank decreases and the bell or casing 3 descends the projecting arm 46 carried thereby engages and operates the curved lever 47, elevating its weighted end and depressing its free end and causing through this movement the engagement of the pivoted lever 50 with the wings or flanges 46 on the plate 45, spindle 31, and plate 32, so as to partially revolve the same and bring the succeeding bucket over the spout 40, at which time its hinged bottom is operated by the trip, as heretofore described, and the fixed quantity of carbid is precipitated into the water within the generator. This operation is repeated automatically until all the buckets or holders are empty, and the quantity of gas generated is thus automatically regulated with the quantity consumed. By this means a steady and uniform measure of the gas and a consequent uniform and steady light are obtained.

It will of course be observed that various changes may be made in the details of construction without departing from the general spirit of my invention.

Having thus described my invention, what I claim, and desire to secure by Letters Patent, is—

1. The combination with the generating-tank and the gasometer, of the dome of greater width than the generating-tank and mounted on top thereof, said dome having a bottom with a discharge-spout connected thereto and extending into the generating-tank, a vertical spindle rotatably mounted on the bottom of the dome and extending through the top thereof, a water seal arranged around said vertical spindle, a plate rigidly mounted on said rotatable spindle within the dome, a series of buckets circumferentially arranged upon said plate, each of said buckets having a hinged bottom, a trip secured to the bottom of the dome and adapted to operate said hinged bottoms when directly over the discharge-spout, a plate rigidly connected to said rotatable spindle above the dome and provided with a series of radially-extending wings, an operating-lever pivotally secured to the top of the dome and adapted to engage said radially-extending wings, said operating-lever being actuated by the movement of the gasometer to operate the rotatable shaft and revolve the buckets, substantially as shown and described.

2. In a gas-generator, a gas-generating tank, a dome supported on the top of said tank, a rotatable vertical spindle supported upon the bottom of said dome, a water seal arranged around said spindle, a series of buckets for holding the gaseous material arranged around and supported from said rotatable spindle, each of said buckets having a hinged bottom, a tripping mechanism for automatically opening said bottom and for closing the same after the material has been discharged, a plate secured to the upper end of said spindle above the dome and provided with a series of radially-extending wings, a lever pivotally supported from the top of the dome and adapted to engage said wings, combined with a gasometer and the generating-tank, means within the inner casing to permit the escape of gas when the supply from the generating-tank exceeds the capacity of the gasometer, and means carried by the gasometer to engage and operate the operating-lever to rotate the spindle and buckets, substantially as shown and described.

In testimony whereof I affix my signature in presence of two witnesses.

GEORGE F. DILLON.

Witnesses:
J. W. GARDNER,
E. J. DORSEY.